United States Patent [19]

Janson

[11] Patent Number: 5,033,323
[45] Date of Patent: Jul. 23, 1991

[54] GEAR RATTLE DAMPER FOR COUNTERSHAFT TRANSMISSIONS

[75] Inventor: David A. Janson, Plymouth, Mich.

[73] Assignee: Eaton Corporation, Cleveland, Ohio

[21] Appl. No.: 315,008

[22] Filed: Feb. 24, 1989

[51] Int. Cl.$^5$ .......................... F16H 3/08; F16D 3/56
[52] U.S. Cl. ..................................... 74/375; 74/409; 74/411; 464/97; 464/160
[58] Field of Search ................. 74/363, 375, 409, 411, 74/701; 464/97, 160, 41

[56] References Cited

U.S. PATENT DOCUMENTS

| | | | |
|---|---|---|---|
| 2,667,049 | 1/1954 | Guernsey et al. | 464/160 |
| 2,738,660 | 3/1956 | Gail | 64/1 |
| 3,298,240 | 1/1967 | McDowell et al. | 74/411 |
| 3,321,988 | 5/1967 | Péras | 464/97 X |
| 3,908,401 | 9/1975 | Harbage | 464/160 X |
| 4,082,139 | 4/1978 | Davis | 464/97 X |
| 4,212,380 | 7/1980 | Billet | 192/106.2 |
| 4,287,791 | 9/1981 | Numazawa et al. | 74/701 |
| 4,519,264 | 5/1985 | Inui | 74/409 |
| 4,559,023 | 12/1985 | Uchibaba et al. | 74/411 X |
| 4,629,443 | 12/1986 | Bördner et al. | 74/411 X |
| 4,677,868 | 7/1987 | Filkins | 74/359 |
| 4,700,582 | 10/1987 | Bessette | 74/409 |
| 4,754,659 | 7/1988 | Rietsch | 74/411 |

FOREIGN PATENT DOCUMENTS 905813 2/1934 United Kingdom ................ 464/97

Primary Examiner—Allan D. Herrmann
Assistant Examiner—Benjamin Levi
Attorney, Agent, or Firm—P. S. Rulon

[57] ABSTRACT

A manual transmission (14′) having a counter-shaft assembly (50) with a torsion damping mechanism (34) disposed therein to mitigate in-gear rattle of transmission gears. The countershaft assembly is mounted for rotation in a transmission housing (36). Assembly (50) includes a cluster gear (58) having a plurality of ratio gears (68–76) fixed thereto, a driven gear (60) journaled on the cluster gear and stops (58f, 60g) to limit relative rotation. The torsion damping mechanism includes a torsion bar (64) fixed at its ends to driven and cluster gears (60, 58), an energy damper having coulomb friction surfaces engaged by Belleville springs (80) and by opposing axial forces provided by helical gear teeth of the countershaft assembly.

3 Claims, 2 Drawing Sheets

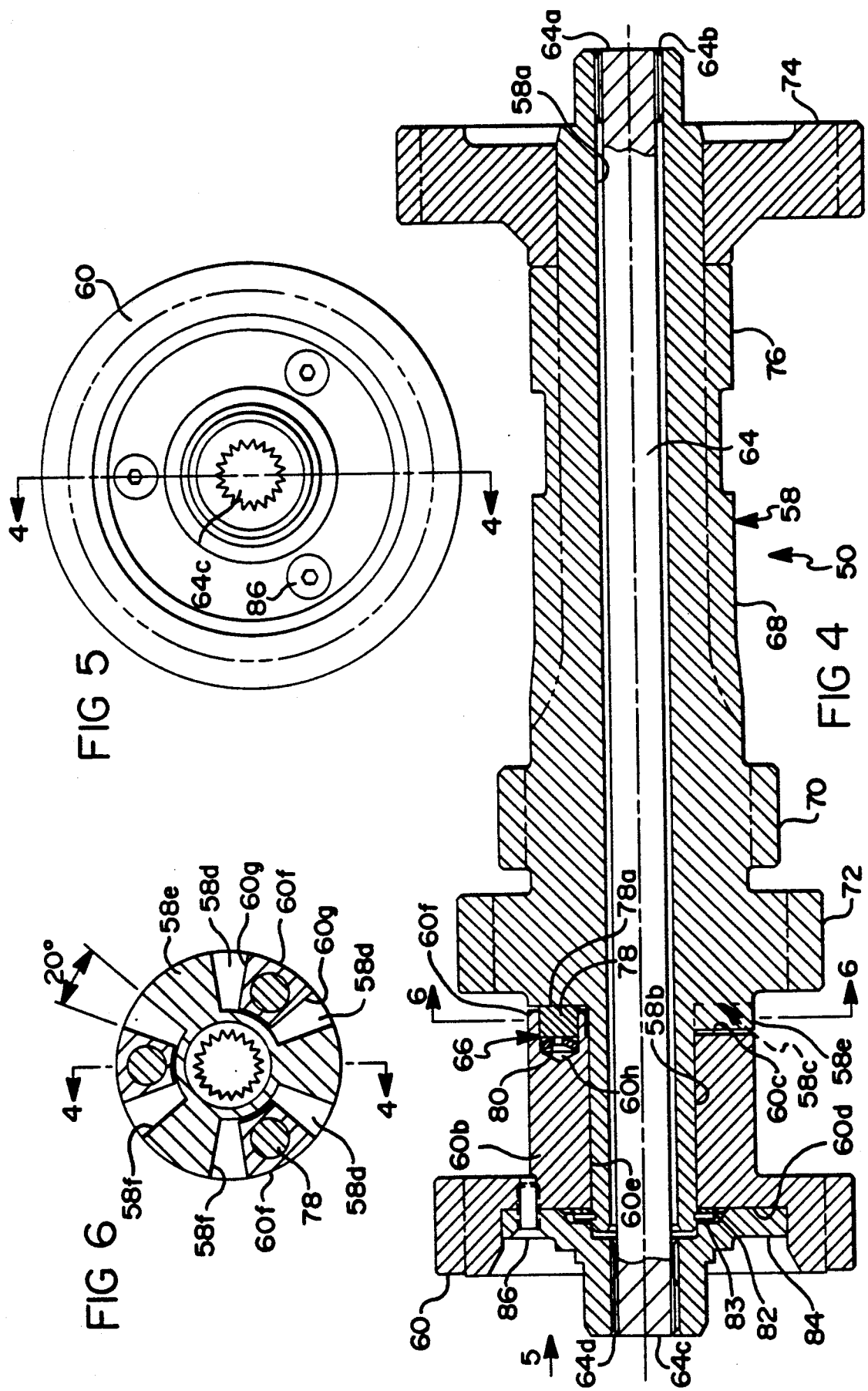

GEAR RATTLE DAMPER FOR COUNTERSHAFT TRANSMISSIONS

FIELD OF THE INVENTION

The present invention relates to a mechanism for reducing in-gear rattle in a constant mesh transmission of the countershaft type. More specifically, the invention relates to such a mechanism incorporated in the countershaft.

BACKGROUND OF THE INVENTION

Torsion damping mechanisms have long been used to reduce the adverse effects of torsionals or fluctuating torques in vehicle drivelines. Such torsionals or fluctuating torques emanate primarily from engine power pulses and torque spikes, and from abrupt changes in driveline torque due primarily to rapid engine acceleration/deceleration and transmission ratio changes. Effective damping of such torsionals has become increasingly more difficult due to current development trends necessitated by a need to improve vehicle efficiency. The need for improved vehicle efficiency has resulted in reductions in vehicle size and weight, reductions in inertia of driveline components such as flywheel masses, reductions in the number of engine cylinders or chambers, reductions in engine speed, increases in the number of transmission gear ratios, reductions in transmission oil viscosity, and increased use of torque converter bypass clutches.

These developments have dramatically increased existing problems with transmission gear rattle noise, vehicle body noise, and vehicle jerk. Body noise or body boom, as it is sometimes referred to, often occurs when an engine is lugged; under such a condition, engine torsionals cause body components, such as sheet metal panels, to resonate. Vehicle jerk, known as tip-in/tipout, occurs in response to abrupt engine acceleration/deceleration and ratio changes.

Gear rattle, which may be idle rattle and/or in-gear rattle, occurs when unloaded tooth flanks of meshed gears bounce against each other. Both gear rattle problems can be particularly acute when engine torsionals or power pulse frequencies and their harmonics are the same as resonant frequencies of the transmission gear ratios. Idle rattle occurs when a manual transmission is in neutral with the transmission input shaft clutched to an engine running at or near its idle setting, i.e., when engine speed and torque are low or minimum. In-gear rattle occurs when the transmission is in gear (usually low speed gears) and clutched to an engine running above its idle setting, i.e., when engine speed and torque are relatively low but sufficient to drive a load or vehicle.

The prior art is replete with mechanisms of negating or mitigating both forms of gear rattle, body boom, and vehicle jerk. Such mechanisms are commonly incorporated in master clutch plates and, of late, in so called two mass flywheels. It is also known to incorporate a mechanism in a transmission countershaft to mitigate idle rattle.

U.S. Pat. No. 4,677,868 discloses an idle rattle mechanism incorporated in a countershaft assembly of a manual transmission of the general type disclosed herein. The countershaft assembly includes a cluster gear having ratio gears fixed thereto, a driven or head gear journaled on the cluster gear, loosely intermeshed teeth fixed to the cluster gear and the driven gear to limit relative rotation therebetween, and a viscous liquid disposed between the teeth for damping engine idle torsionals which cause idle rattle. This mechanism is not believed to be effective for reducing in-gear rattle, body boom, or vehicle jerk.

SUMMARY OF THE INVENTION

An object of this invention is to provide means within a constant mesh transmission to mitigate in-gear rattle.

Another object of this invention is to provide such a means which is also effective to mitigate body boom and vehicle jerk.

According to an object of this invention, a torque transmitting countershaft assembly includes a cluster gear having a plurality of ratio gears fixed thereto and a driven gear journaled thereon. The assembly is adapted to be mounted for rotation in a transmission housing with the rotational axis of the assembly spaced from and parallel to a common axis of a drive gear having gear teeth in constant mesh with gear teeth of the driven gear and a plurality of selectable gears having gear teeth in constant mesh with gear teeth of the ratio gears. The assembly also includes stop means for limiting rotation of the driven gear relative to the cluster gear and energy damping means interposed between the driven gear and the cluster gear. The invention is characterized by a torsion spring shaft disposed in an axially extending bore in the cluster gear with one end of the spring fixed to the cluster gear and the other end fixed to the driven gear, whereby the spring transmits torque and attenuates torsionals between the driven and cluster gears and reduces the natural frequency of the ratio gears; the stop means limits relative rotation to less than 70% of the normal torque transmitting load of the assembly; and the energy damper means is operatively disposed in parallel with the spring.

BRIEF DESCRIPTION OF THE DRAWINGS

The preferred embodiment of the invention is shown in the accompanying drawings in which:

FIG. 4 is a detailed sectional view of the countershaft assembly looking along lines 4—4 in FIGS. 5 and 6;

FIG. 5 is an end view of the countershaft assembly looking in the direction of arrow 5 in FIG. 4; and FIG. 6 is a cross-sectional view of a portion of the countershaft assembly looking along line 6—6 in FIG. 4.

DETAILED DESCRIPTION OF THE DRAWINGS

Figure 1:
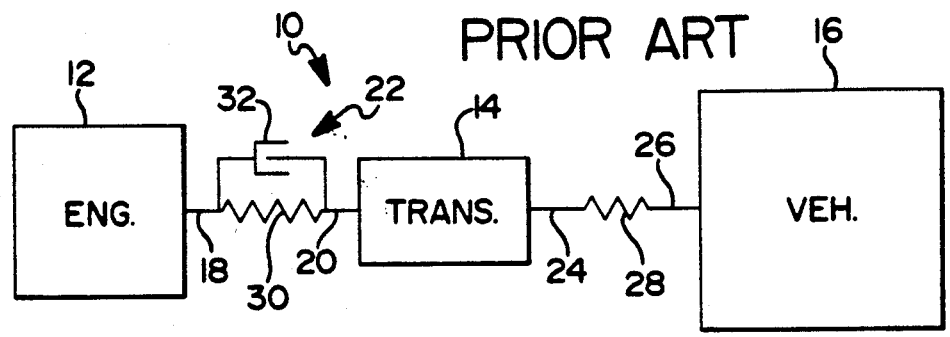
FIG. 1 is a schematic view of a vehicle driveline according to the prior art.

The schematically illustrated driveline 10 of FIG. 1 includes an engine or prime mover 12, a transmission 14, and a vehicle 16. An engine output shaft 18 is drivingly connectable to a transmission input shaft 20 via a torsional damping mechanism 22 which is commonly incorporated in a master clutch, not shown. A transmission output shaft 24 is drivingly connected to unshown wheels of the vehicle via conventional components represented by a driveshaft 26 and collectively having resiliency represented at 28. Damping mechanism 22 includes resilient means 30 for transmitting driveline torque and attenuating torsionals therein, and an energy damper 32 disposed in parallel with resilient means 30 operative to reduce the rate of recoil of the resilient means. Damping mechanism 22 may be of the type disclosed in U.S. Pat. No. 4,212,380 wherein the resilient means includes relatively stiff springs for transmitting in-gear torque and substantially less stiff springs disposed in series with the stiff springs for mitigating idle rattle of transmission gears.

Figure 2:
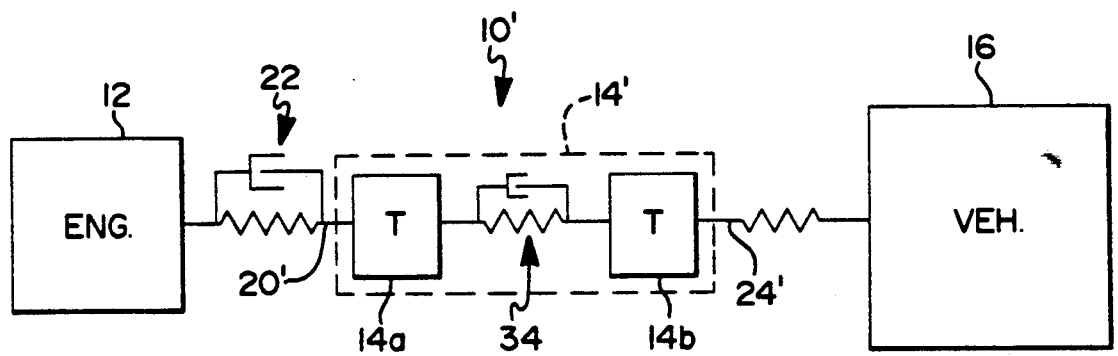
FIG. 2 is a schematic view of a vehicle driveline according to the present invention.
Figure 3:
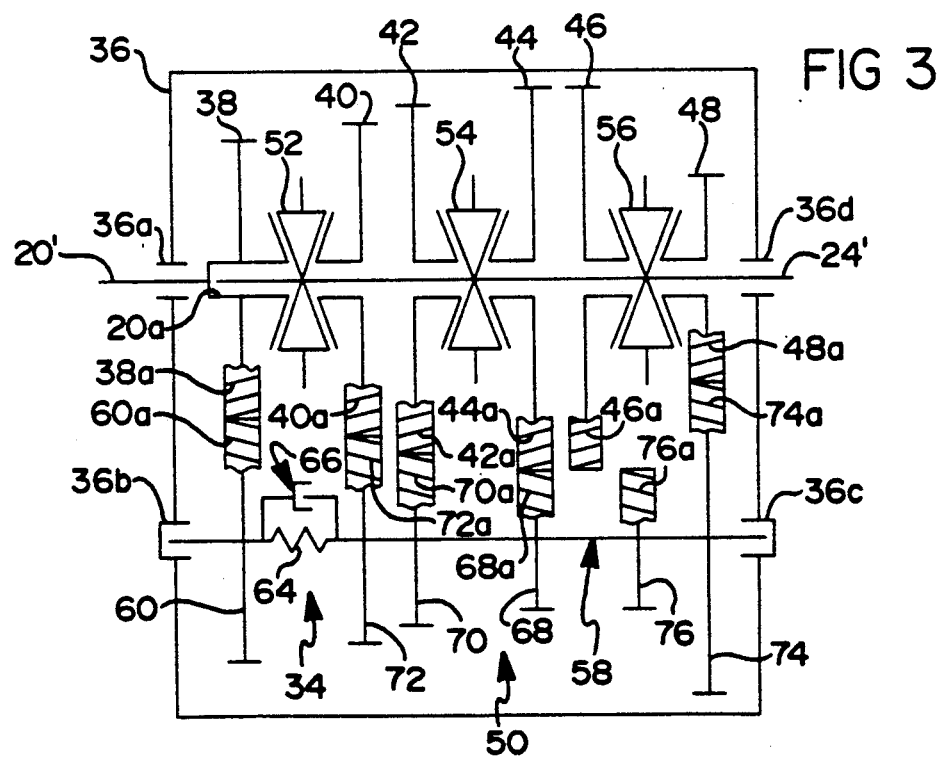
FIG. 3 is a schematic view of a transmission illustrating the operational position of the present invention in a countershaft assembly therein.

The schematically illustrated driveline 10' of FIG. 2 differs from FIG. 1 in that transmission 14' is functionally separated into transmission sections 4a,14b by a torsional damping mechanism 34 for mitigating in-gear rattle. As disclosed further hereinafter, transmission 14' includes clutch means which, when engaged, connect shaft 20' directly to shaft 24', thereby bypassing damper mechanism 34. Transmission 14', as illustrated in FIG. 3, includes a housing 36, an input drive shaft 20' journaled in the housing at 36a and having a drive gear 38 fixed thereto, an output drive shaft 24' having a plurality of selectable gears 40,42,44,46,48 journaled thereto, and a countershaft assembly 50 journaled in the housing at 36b,36c. Output shaft 24' is journaled at its right end in the housing at 36d and at its left end in a pilot 20a of shaft 20'. Gears 40,42,44,46 and 48 and input shaft 20' are selectably connectable to output shaft 24' by double acting synchronizer clutches 52,54,56 or other known clutches.

Countershaft assembly 50, as also seen in FIGS. 4-6, includes a cluster gear 58, a head or driven gear 60 having partially shown helical gear teeth 60a in constant mesh with partially shown helical gear teeth 38a of drive gear 38, and the torsional damping mechanism 34. Mechanism 34 includes a spring 64 providing a resilient driving connection between driven gear 60 and cluster gear 58, and an energy damper 66 frictionally reacting between the driven and cluster gears and in parallel with the spring. The cluster gear includes a first or low speed ratio gear 68 having partially shown helical teeth 68a in constant mesh with partially shown helical teeth 44a of selectable gear 44, a second speed ratio gear 70 having helical teeth 70a in constant mesh with helical teeth 42a of gear 42, a third speed ratio gear 72 having helical teeth 72a in constant mesh with helical teeth 40a of gear 40, a fifth or overdrive ratio gear 74 having helical teeth 74a constant mesh with helical teeth 48a of gear 48, and a reverse ratio gear 76 having helical teeth 76a drivingly connected to helical teeth 46a of gear 46 via an unshown idle gear in conventional manner. A fourth speed ratio or direct drive ratio is provided by engaging clutch 52 leftward, thereby bypassing damping mechanism 34. Driven gear 60 is rotated counterclockwise by gear 38 and the direction of angles of the driven gear helical teeth 60a provide rightwardly directed, axial forces when torque flow is from gear 38 to driven gear 60. These rightward, axial forces are opposed by leftwardly directed, axial forces provided by helical teeth of the cluster gear ratio gears when torque flow is from the ratio gears to the selectable gears.

Looking now mainly at the detailed view in FIGS. 4-6, cluster gear 58 of the countershaft assembly includes an axially extending bore 58a, an axially extending outer cylindrical surface 58b, and an axially facing shoulder 58c defining a set of three friction surfaces 58d disposed in a common plane normal to the axis of the cluster gear and circumferentially separated by a set of three axially extending projections 58e having flank surfaces or stops 58f.

Driven gear 60, includes a hub portion 60b having axially facing ends 60c,60d and an inner cylindrical surface 60e which may be directly journaled on cluster gear surface 58b, as shown, or journaled thereon by a sleeve or anti-friction bearing, a set of three axially extending projections 60f interdigitated with projections 58e and having flank surface or stops 60g. Projections 60f each includes a blind bore or recess 60h which each have an axially movable friction shoe 78 and spring 80 disposed therein for biasing mechanical or coulomb friction surfaces 78a of the shoes toward engagement with a friction surface 58d. Herein spring 80 is of the Belleville or spring washer type; however, other types may be used. Rightward axial movement of gear 60 is limited by an annular thrust bearing 82 sandwiched between hub end 60d and a retainer 83 disposed in an annular groove in outer cylindrical surface 58b.

Spring 64 is of the torsion bar or torsion shaft type and is fixed at its right end 64a by external splines 64b which mate with internal splines in bore 58a. The left end 64c of the spring bar is fixed to driven gear 60 by an end cap 84 secured to the gear by fastening means, herein a plurality of screws 86. End 64c is fixed to cap 84 by external splines 64d which mate with internal splines of the cap. Stops 58f,60g allow approximately 20° of rotational free play between gear 60 and cluster gear 58. Torsion bar 64 is designed to resiliently transmit less than 70%, preferably less than 60%, of the normal torque transmitting load of the countershaft assembly before stops 58f,60g engage. The opposing axial forces provided by the helical teeth of driven gear 60 and the ratio gears, when torque flow is to the selectable gears, increase the engaging force of friction shoes 78 against friction surfaces 58d; accordingly, the amount of energy damping or hysteresis is proportional to the torque being transmitted until axial movement of driven gear 60 relative clutch gear 58 is arrested by engagement of thrust bearing 82, thereafter damping is limited by the force of springs 80. Belleville spring 80 ensures energy damping operation when the axial forces provided by the helical teeth are in opposite directions due to torque flow from the selectable gears to the ratio gears during coast mode operation.

A preferred embodiment of the present invention has been disclosed for illustrative purposes. Many variations and modifications of the embodiment are believed to be within the spirit of the invention. The following claims are intended to cover the inventive portions of the preferred embodiment and variations and modifications within the spirit of the invention.

What is claimed is:

1. A torque transmitting countershaft assembly including a cluster gear having a plurality of ratio gears fixed thereto and a driven gear journaled thereon, the assembly adapted to be mounted for rotation in a transmission housing with the assembly rotational axis spaced from the parallel to a common axis of a drive gear having gear teeth in constant mesh with gear teeth of the driven gear and a plurality of selectable gears having gear teeth in constant mesh with gear teeth of the ratio gears, stop means for limiting rotation of the driven gear relative to the cluster gear, energy damper means interposed between the driven gear and the cluster gear; characterized by:

a torsion spring shaft disposed in an axially extending bore in the cluster gear with one end of the spring shaft fixed to rotate with the cluster gear and the other end fixed to rotate with the driven gear, the spring shaft for transmitting torque and attenuating torsionals between the driven and cluster gears and for reducing the natural frequency of the ratio and selectable gears;

the stop means operative to limit the relative rotation of the assembly and torque transmission of the spring shaft to less than 70% of the normal torque transmitting load of the assembly;

the driven gear including an axially extending hub portion having first and second axially facing portions and a cylindrical surface journaled on an axially extending cylindrical surface of the cluster gear;

the first axially facing portion of the hub portion of the driven gear and a shoulder of the cluster gear each including a set of axially extending, circumferentially spaced apart, and interdigitated projections having circumferential free play between flank surfaces thereof for defining the stop means, and the second axially facing portion reacting against thrust means for limiting axial movement relative to the cluster gear; and energy damper means being disposed in parallel with the spring shaft, the damper means comprising:

friction surfaces being disposed between the first axially facing portion and a shoulder of the cluster gear, axially facing free ends of the projections of one set of projections including axially extending blind recesses each having an axially movable friction shoe disposed therein and biased against axially facing surfaces between the projections of the other set of projections by spring means disposed in the recesses.

2. A torque transmitting countershaft assembly including a cluster gear having a plurality of ratio gears fixed thereto and a driven gear journaled thereon, the assembly adapted to be mounted for rotation in a transmission housing with the assembly rotational axis spaced from and parallel to a common axis of a drive gear having gear teeth in constant mesh with gear teeth of the driven gear and a plurality of selectable gears having gear teeth in constant mesh with gear teeth of the ratio gears, stop means for limiting rotation of the driven relative to the cluster gear; characterized by:

a torsion spring shaft disposed in an axially extending bore in the cluster gear with one end of the spring shaft fixed to rotate with the cluster gear and the other end fixed to rotate with the driven gear, the spring shaft for transmitting torque and attenuating torsionals between the driven and cluster gears and for reducing the natural frequency of the ratio and selectable gears;

the stop means operative to limit the relative rotation of the assembly and torque transmission of the spring shaft to less than 70% of the normal torque transmitting load of the assembly;

energy damper means being disposed in parallel with the spring shaft, and the damper means comprising;

first and second mechanical friction surfaces respectfully secured for rotation with the driven drive and the cluster gear;

engagement means for applying axial forces for engaging the friction surface;

the driven gear includes an axially extending hub portion having first and second axially facing portions and a cylindrical inner surface journaled on an axially extending outer cylindrical surface of the cluster gear, the friction surfaces being disposed between the first axially facing portion and a shoulder of the cluster gear, the second axially facing portion reacting against thrust means for limiting axial movement relative to the cluster gear;

the first axially facing portion of the hub portion of the driven gear and the shoulder of the cluster gear each include a set of axially extending, circumferentially spaced apart, and interdigitated projections having circumferential free play between flank surfaces thereof for defining the stop means; and axially facing free ends of the projections of one set of projections including axially extending blind recesses each having an axially movable friction shoe disposed therein and biased against axially facing surfaces between the projections of the other set of projections by spring means disposed in the recesses.

3. A torque transmitting countershaft assembly including a cluster gear having a plurality of ratio gears fixed thereto and a driven gear journaled thereon, the assembly adapted to be mounted for rotation in a transmission housing with the assembly rotational axis spaced from and parallel to a common axis of a drive gear having gear teeth in constant mesh with gear teeth of the driven gear and a plurality of selectable gears having teeth in constant mesh with gear teeth of the ratio gears, stop means for limiting rotation of the driven gear relative to the cluster gear; characterized by;

a torsion spring shaft disposed in an axially extending bore in the cluster gear with one end of the spring shaft fixed to rotate with the cluster gear and the other end fixed to rotate with the driven gear, the spring shaft for transmitting torque and attenuating torsionals between the driven and cluster gears and for reducing the natural frequency of the ratio and selectable gears;

the stop means operative to limit the relative rotation of the assembly and torque transmission of the spring shaft to less than 70% of the normal torque transmitting load of the assembly;

energy damper means disposed in parallel with the spring shaft, the damper means comprising;

first and second mechanical friction surfaces respectively secured for rotation with the driven gear and the cluster gear;

engagement means for applying axial forces for engaging the friction surfaces, the engagement means including the meshing gear teeth being helical gear teeth having helix angles such that the driven gear and the ratio gears produce the axial forces in opposing directions when the direction of transmitted torque is to selected gears, and spring means for biasing one of the friction surfaces into engagement with other friction surface;

the driven gear including an axially extending hub portion having first and second axially facing portions and a cylindrical inner surface journaled on an axially extending outer cylindrical surface of the cluster gear, the friction surfaces being disposed between the first axially facing end and a shoulder of the cluster gear, the second axially facing portion reacting against thrust means for limiting axial movement relative to the cluster gear;

the first axially facing portion of the hub portion of the driven gear and the shoulder of the cluster gear each including a set of axially extending, circumferentially spaced apart, and interdigitated projections having circumferential free play between flank surfaces thereof for defining the stop means; and axially facing free ends of the projections of one set of projections including axially extending blind recesses each having an axially movable friction shoe disposed therein and biased against axially facing surfaces between the projections of the other set of projections by spring means disposed in the recesses.

* * * * *